United States Patent [19]

Ubukata

[11] Patent Number: 5,038,206
[45] Date of Patent: Aug. 6, 1991

[54] PICTURE-QUALITY IMPROVING CIRCUIT
[75] Inventor: Tsuneo Ubukata, Yokohama, Japan
[73] Assignee: Victor Company of Japan, Ltd., Japan
[21] Appl. No.: 344,874
[22] Filed: Apr. 28, 1989
[30] Foreign Application Priority Data
Apr. 30, 1988 [JP] Japan .................................. 63-107841
Jun. 24, 1988 [JP] Japan .................................. 63-156089
[51] Int. Cl.$^5$ ........................ H04N 9/64; H04N 5/208
[52] U.S. Cl. ...................................................... 358/37
[58] Field of Search .......................................... 358/37
[56] References Cited
U.S. PATENT DOCUMENTS
4,316,215  2/1982  Yasumoto et al. ..................... 358/37
4,504,853  3/1985  Faroudja ................................ 358/37
4,553,157  11/1985  Hurst et al. ............................ 358/37

FOREIGN PATENT DOCUMENTS
127786  10/1980  Japan ...................................... 358/37
127787  10/1980  Japan ...................................... 358/37

Primary Examiner—John W. Shepperd
Attorney, Agent, or Firm—Lowe, Price, LeBlanc, Becker & Shur

[57] ABSTRACT

In a picture-quality improving circuit, a luminance transition is detected on the basis of a luminance signal. Chroma edge characteristics of a color signal are enhanced in accordance with the detected luminance transition. A detection is made as to whether the color signal and the luminance signal are correlated or uncorrelated in transition. When the color signal and the luminance signal are uncorrelated in transition, the enhancement of the chroma edge characteristics of the color signal is interrupted.

2 Claims, 10 Drawing Sheets

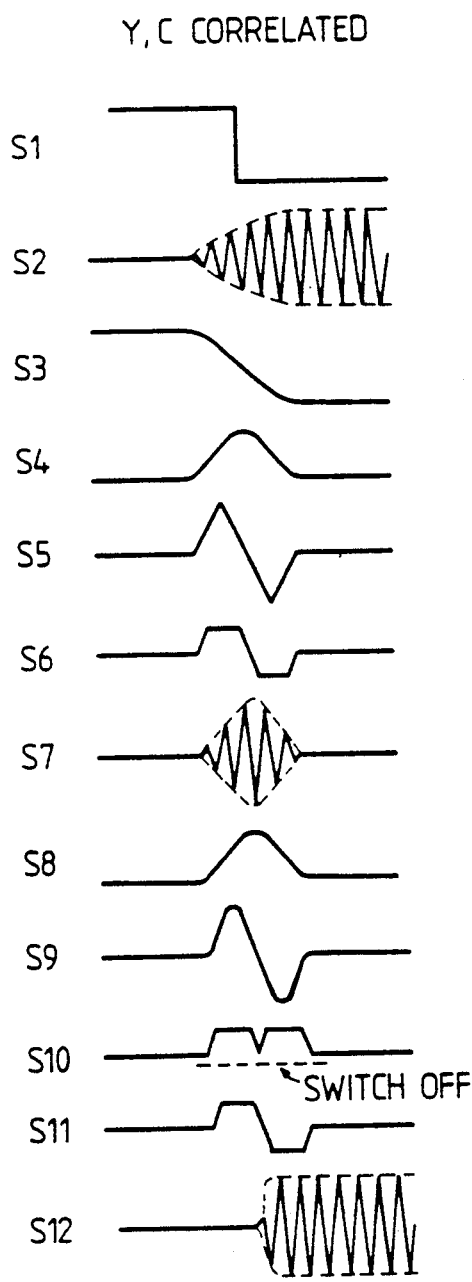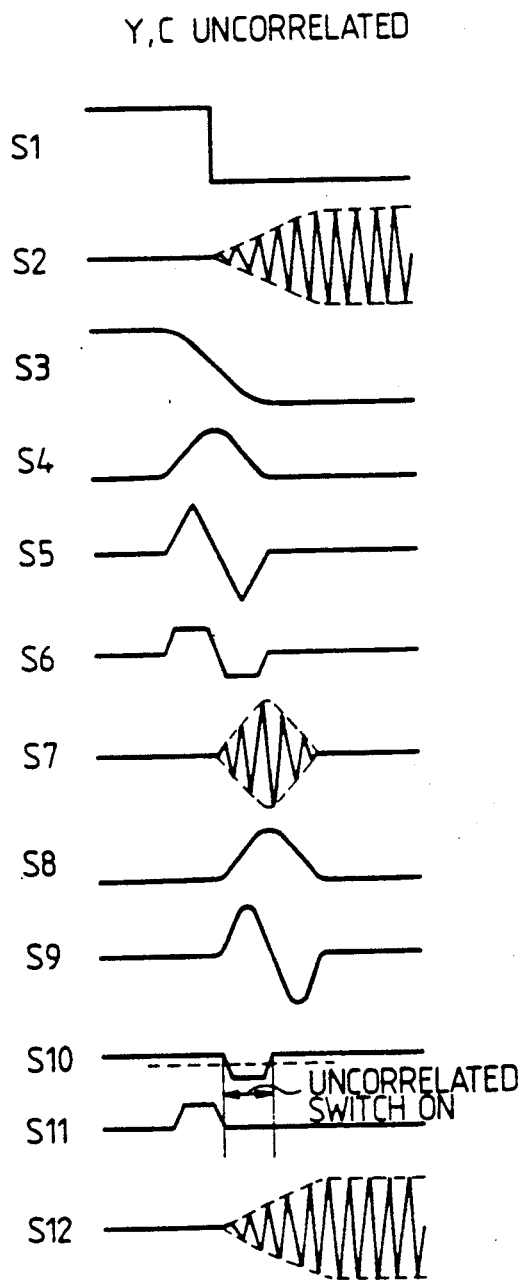

FIG. 4
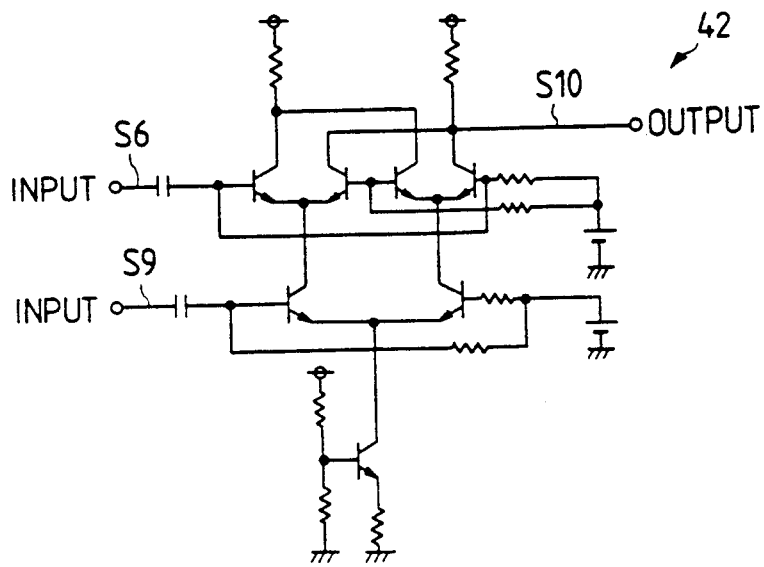
FIG. 5
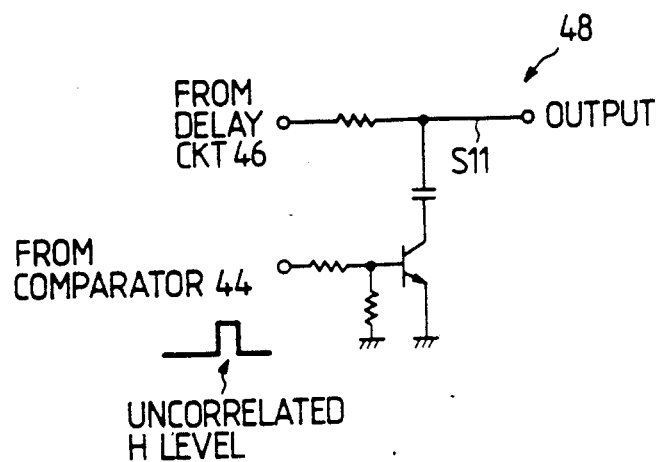
FIG. 6
|  | S6 | | |
|---|---|---|---|
|  | a | 0 | -a |
| S9 b | a | 0 | 0 |
| 0 | a | 0 | -a |
| -b | 0 | 0 | -a |
(a>0)
(b>0)

FIG. 7
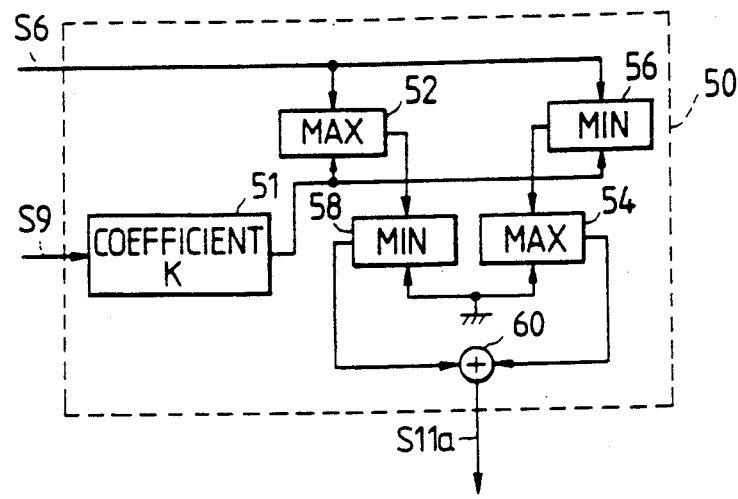
FIG. 8
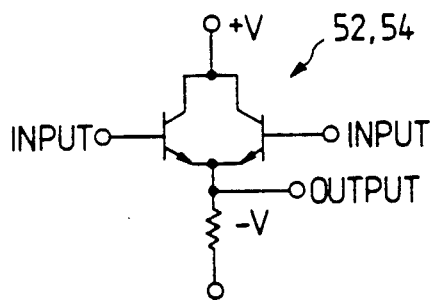
FIG. 9
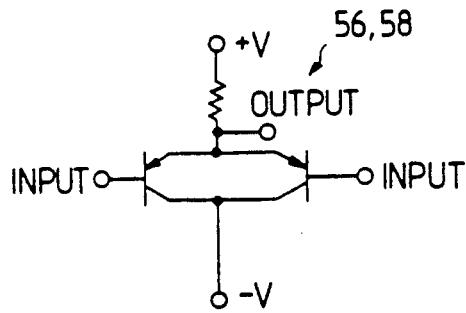
FIG. 10
| | | S6 | | |
|---|---|---|---|---|
| | | a | 0 | -a |
| S9 | b | MIN (a,kb) ≃ a | 0 | 0 |
| | 0 | 0 | 0 | 0 |
| | -b | 0 | 0 | MAX (a,kb) ≃ -a |
$\begin{bmatrix} a > 0 \\ b > 0 \\ k > 1 \end{bmatrix}$

Y,C CORRELATED

S6

S9a

S6a

S11c

Y,C UNCORRELATED

PICTURE-QUALITY IMPROVING CIRCUIT

BACKGROUND OF THE INVENTION

1. Field of the Invention

This invention relates to a picture-quality improving circuit usable in various systems such as television systems or video systems.

2. Description of the Prior Art

There is a recognized need to sharpen the images of television signals, particularly at transition edges where the picture changes brightness or color, or both brightness and color. In television signal formats such as NTSC and PAL, the color information is encoded on a subcarrier which is interleaved with the baseband luminance information. An inherent drawback of these formats is the limited bandwidth for the color information component, called "chroma" or "chrominance".

There are many chances in a color television system for the chroma information to become degraded, particularly at transitions from one hue to another.

U.S. Pat. No. 4,504,853 discloses a color television processing system which enhances aperiodic transitions occurring in a quadrature modulated subcarrier by deriving a control signal from simultaneously occurring aperiodic transitions in the luminance, without demodulation of the chroma subcarrier. The system of U.S. Pat. No. 4,504,853 includes an input, a delay match for delaying a modulated subcarrier signal by a predetermined amount, a one-half period delay for delaying the modulated subcarrier signal by half the period thereof, and a first adder for combining in equal amounts the undelayed modulated subcarrier with the signal delayed by the one-half period delay to provide a transition envelope. A control generator receives the luminance signal and derives a control signal from transitions occurring in the luminance. A multiplier multiplies the transition envelope signal by the control signal to provide an enhancement product. A second adder combines the delay matched modulated subcarrier in phase with the enhancement product to put out the enhanced modulated subcarrier characterized by shortened transitions in alignment with simultaneous transitions in the baseband.

Since the system of U.S. Pat. No. 4,504,853 uses a correlation between the color signal and the luminance signal in improving the transition characteristics of the color signal, the intended effect is realized when the color signal actually correlates to the luminance signal. In the system of U.S. Pat. No. 4,504,853, when the luminance signal and the color signal are uncorrelated and the color signal changes at a point near a change of the luminance signal, the edge information of the color signal is easily modulated with the edge information of the luminance signal so that the color signal tends to be contaminated by false edge information.

SUMMARY OF THE INVENTION

It is an object of this invention to provide an excellent picture-quality improving circuit.

In a picture-quality improving circuit of this invention, a luminance transition is detected on the basis of a luminance signal. Chroma edge characteristics of a color signal are enhanced in accordance with the detected luminance transition. A detection is made as to whether the color signal and the luminance signal are correlated or uncorrelated in transition. When the color signal and the luminance signal are uncorrelated in transition, the enhancement of the chroma edge characteristics of the color signal is interrupted.

BRIEF DESCRIPTION OF THE DRAWINGS

FIG. 2 is a timing diagram showing the waveforms of various signals in the picture-quality improving circuit of FIG. 1 which occur when the luminance signal and the color signal are mutually correlated.

FIG. 3 is a timing diagram showing the waveforms of various signals in the picture-quality improving circuit of FIG. 1 which occur when the luminance signal and the color signal are uncorrelated.

FIG. 4 is a schematic diagram of the phase comparator of FIG. 1.

FIG. 5 is a schematic diagram of the switch of FIG. 1.

FIG. 6 is a diagram showing the relationship among the voltages of the input and output signals in connection with the logic circuit of FIG. 1.

FIG. 7 is a block diagram of a logic circuit in a picture-quality improving circuit according to a second embodiment of this invention.

FIG. 8 is a schematic diagram of the maximum selector of FIG. 7.

FIG. 9 is a schematic diagram of the minimum selector of FIG. 7.

FIG. 10 is a diagram showing the relationship among the voltages of the input and output signals in connection with the logic circuit of FIG. 7.

DESCRIPTION OF THE FIRST PREFERRED EMBODIMENT

Figure 1:
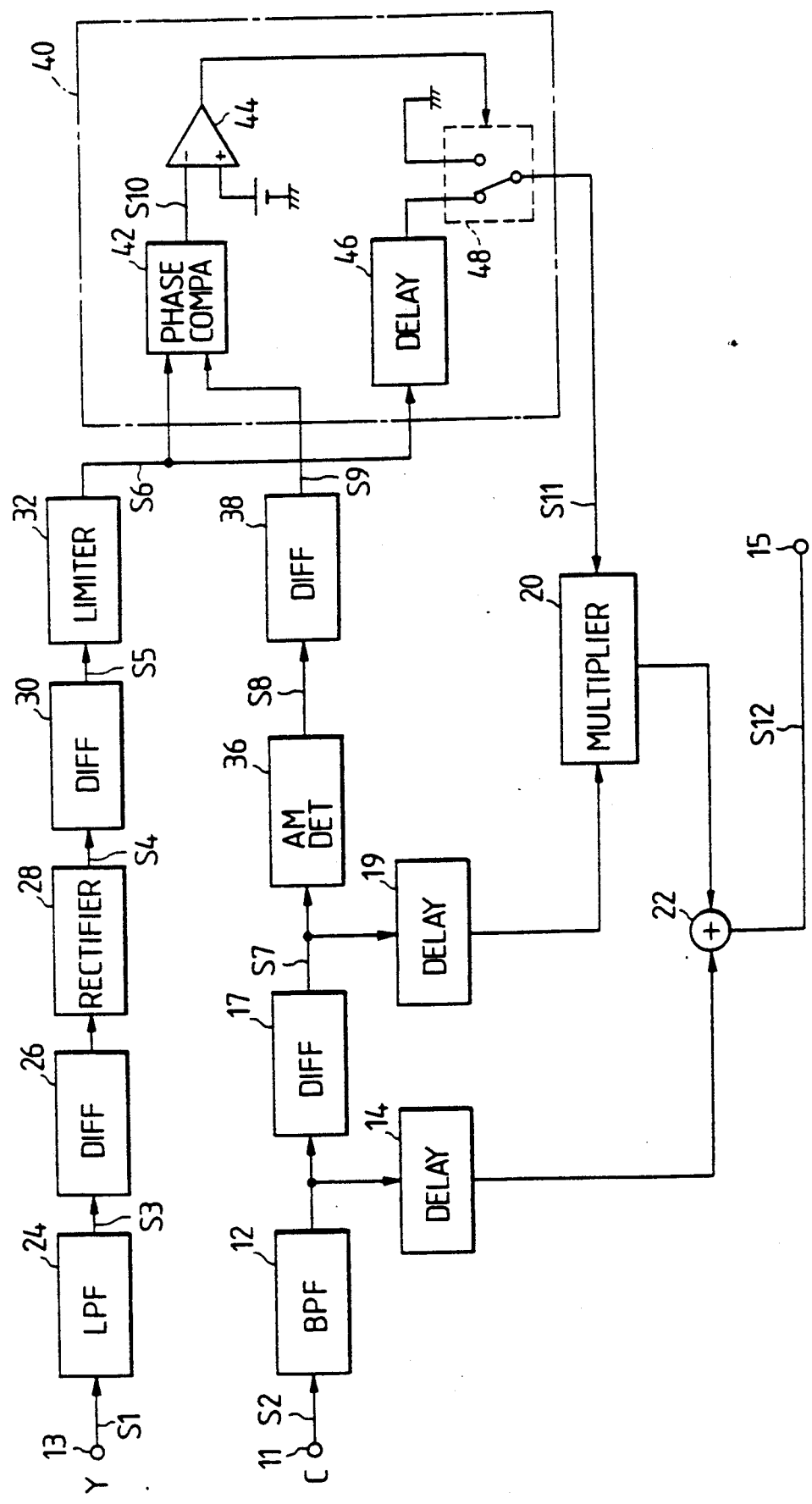
FIG. 1 is a block diagram of a picture-quality improving circuit according to a first embodiment of this invention.

With reference to FIGS. 1-3, a luminance signal (Y signal) S1 inputted via an input terminal 13 is fed to a differentiator 26 via a low-pass filter (LPF) 24. The LPF 24 functions to remove anything but luminance transitions (luminance edges) and thereby to make those transitions very solid and well defined, free of noise and other high frequency components. The low-pass filtered luminance signal is then subjected to a first differentiation by the differentiator 26 to yield a pulse which corresponds in direction to the luminance transition. This pulse is proportional to the degree of the luminance transition. The pulse output signal from the differentiator 26 is fed to a full-wave rectifier 28. The pulse is converted by the rectifier 28 into an absolute-value pulse signal S4.

The absolute-value pulse signal S4 is passed through a differentiator 30 which yields a signal S5 representing a differential of the absolute value of the luminance transition. The waveform of the differentiated signal S5 is closely analogous to a single sinusoid having a positive-going first peak, followed by a negative-going second peak, followed by a return to the zero value. A limiter 32 connected to the differentiator 30 limits the amplitude of the double pulse differential signal S5 and thereby derives an amplitude-limited signal S6. The amplitude-limited signal is applied to a logic circuit 40.

A color signal (C signal) S2 inputted via an input terminal 11 is fed to a delay circuit 14 and a differentiator 17 via a band-pass filter (BPF) 12. The BPF 12 limits the bandwidth of the color signal S2 passed therethrough and eliminates the ringing from the color signal S2. The delay circuit 14 delays the band-pass filtered color signal so that when the delayed color signal is combined with an enhancement component later, it will be in exactly the correct phase relationship. The output signal from the delay circuit 14 is applied to a first input terminal of an adder 22.

The differentiator 17 converts the band-pass filtered color signal into a signal S7 which represents chroma transitions (chroma edges). The chroma transition signal S7 is transmitted to a first input terminal of a multiplier 20 via a phase-matching delay circuit 19. A second input terminal of the multiplier 20 receives an output signal S11 from the logic circuit 40. The multiplier 20 outputs a signal which represents a product of the delayed chroma transition signal and the output signal S11 from the logic circuit 40. The output signal from the multiplier 20 is applied to a second input terminal of the adder 22.

The adder 22 combines the output signal from the delay circuit 14 and the output signal from the multiplier 20 and thereby derives an improved color signal S12 having sharp edges.

An AM detector 36 converts the chroma transition signal S7 into a signal S8 which represents an envelope of the signal S7. The envelope signal S8 is passed through a differentiator 38 which yields a signal S9 representing a differential of the chroma transition. The waveform of the differentiated signal S9 is closely analogous to a single sinusoid having a positive-going first peak, followed by a negative-going second peak, followed by a return to the zero value. The output signal S9 from the differentiator 38 is fed to the logic circuit 40.

The logic circuit 40 includes a phase comparator 42, a voltage comparator 44, a delay circuit 46, and a switch 48. As understood from the previous description, the logic circuit 40 receives the output signals S6 and S9 from the limiter 32 and the differentiator 38 and outputs the signal S11 in accordance with these received signals. FIG. 6 shows the relationship among the voltages of the input signals S6 and S9 and the output signal S11. In FIG. 6: the letters "a" and "b" denote positive voltages; the numeral "0" denotes the zero voltage; and the characters "−a" and "−b" denote negative voltages. In FIG. 6, nine small blocks represent the respective voltages of the output signal S11 which occur when the input signal S6 assumes the voltage "a", "0", or "−a" and the input signal S9 assumes the voltage "b", "0", or "−b".

As understood from the previous description, the output signal S6 from the limiter 32 represents luminance transitions while the output signal S9 from the differentiator 38 represents chroma transitions. When the luminance signal S1 and the color signal S2 are correlated in transition, the signals S6 and S9 are in phase. When the luminance signal S1 and the color signal S2 are uncorrelated in transition, the signals S6 and S9 are out of phase. Therefore, the phase comparison between the signals S6 and S9 makes it possible to detect whether the luminance signal S1 and the color signal S2 are correlated or uncorrelated.

The phase comparator 42 within the logic circuit 40 compares the phases of the signals S6 and S9 to detect whether the luminance signal S1 and the color signal S2 are correlated or uncorrelated in transition. When the signals S6 and S9 are in the same polarity, that is, when the luminance signal S1 and the color signal S2 are correlated, an output signal S10 from the phase comparator 42 assumes a potential higher than an operating point. When the signals S6 and S9 are in the opposite polarities respectively, that is, when the luminance signal S1 and the color signal S2 are uncorrelated, the output signal S10 from the phase comparator 42 assumes a potential lower than the operating point. The voltage comparator 44 compares the potential of the output signal S10 from the phase comparator 42 with a reference potential and derives a binary switch-control signal. When the luminance signal S1 and the color signal S2 are correlated, the switch control signal assumes a low level. When the luminance signal S1 and the color signal S2 are uncorrelated, the switch control signal assumes a high level.

The output signal S6 from the limiter 32 is transmitted to a first terminal of the switch 48 within the logic circuit 40 via the delay circuit 46. The delay circuit 46 has a phase matching function. A fixed level potential or a ground potential is fed to a second terminal of the switch 48. A third terminal of the switch 48 is selectively connected to either the first terminal or the second terminal thereof in response to the switch control signal outputted from the voltage comparator 44. The third terminal of the switch 48 outputs the signal S11 to the multiplier 20. When the luminance signal S1 and the color signal S2 are uncorrelated, that is, when the switch control signal assumes the high level, the third terminal of the switch 48 is connected to the second terminal thereof so that the ground potential is outputted to the multiplier 20 as the signal S11. When the luminance signal S1 and the color signal S2 are correlated, that is, when the switch control signal assumes the low level, the third terminal of the switch 48 is connected to the first terminal thereof so that the output signal from the delay circuit 46 is fed to the multiplier 20 as the signal S11.

As shown in FIG. 2, in cases where the luminance signal S1 and the chrominance signal S2 are correlated in transition, the signals S6 and S9 remain in the same polarities so that the output signal from the delay circuit 46 continues to be outputted to the multiplier 20 via the switch 48. In these cases, the multiplier 20 outputs a signal representative of a product of the output signals from the delay circuits 19 and 46, and the product signal is combined in the adder 22 with the delay matched color signal from the delay circuit 14 to yield an enhanced color signal S12 at the output terminal 15.

As shown in FIG. 3, in cases where the luminance signal S1 and the color signal S2 change at respective points close to each other but the luminance signal S1 and the color signal S2 are uncorrelated in transition, during an interval at and near the point of the luminance transition, the signals S6 and S9 assume the opposite polarities respectively so that the switch 48 replaces the output signal from the delay circuit 46 by the ground potential and the ground potential is outputted via the switch 48 to the multiplier 20. During this interval, the multiplier 20 also outputs the ground potential to the adder 22 so that the adder 22 merely passes the output signal from the delay circuit 14 to the output terminal 15. In these cases, the derived color signal S12 is substantially the same as the original color signal S2. The replacement of the output signal from the delay circuit 46 by the ground potential prevents a phantom edge or an erroneous enhancement of the color signal S12 which would be caused by the luminance transition.

The phase comparator 42 has such a known structure as shown in FIG. 4. The structure of the phase comparator 42 may be different from that shown in FIG. 4.

The switch 48 has such a known structure as shown in FIG. 5. The structure of the switch 48 may be different from that shown in FIG. 5.

It should be noted that the input color signal S2 may be a baseband signal or a carrier chrominance signal. In the case where the input color signal S2 is a baseband signal, the BPF 12 and the AM detector 36 are replaced by a low-pass filter and a full-wave rectifier respectively.

It is preferable that delay circuits or phase shifters are provided to compensate the signal lags which are caused by the various processing devices.

DESCRIPTION OF THE SECOND PREFERRED EMBODIMENT

FIG. 7 shows a second embodiment of this invention which is similar to the embodiment of FIGS. 1–6 except that the logic circuit 40 (see FIG. 1) is replaced by a logic circuit 50.

As shown in FIG. 7, the logic circuit 50 includes a coefficient device 51 receiving the output signal S9 from the differentiator 38 (see FIG. 1). The coefficient device 51 is composed of an amplifier. The output signal S6 from the limiter 32 (see FIG. 1) is fed to a first input terminal of a maximum selector 52 and a first input terminal of a minimum selector 56. A second input terminal of the maximum selector 52 and a second input terminal of the minimum selector 56 receive an output signal from the coefficient device 51. The maximum selector 52 selects the higher in potential of the signal S6 and the output signal from the coefficient device 51 and outputs the selected signal to a first input terminal of a minimum selector 58. The minimum selector 56 selects the lower in potential of the signal S6 and the output signal from the coefficient device 51 and outputs the selected signal to a first input terminal of a maximum selector 54. A second input terminal of the maximum selector 54 and a second input terminal of the minimum selector 58 are subjected to a ground potential. The maximum selector 54 selects the higher in potential of the output signal from the minimum selector 56 and the ground potential and outputs the selected signal to a first input terminal of an adder 60. The minimum selector 58 selects the lower in potential of the output signal from the maximum selector 52 and the ground potential and outputs the selected signal to a second input terminal of the adder 60. The adder 60 combines the output signals from the maximum selector 54 and the minimum selector 58 into a signal S11a applied to the multiplier 20 (see FIG. 1).

The coefficient device 51 amplifies the signal S9 by an amplification factor k ($k>1$) to a level such that when the signals S6 and S9 are in the same polarities, the signal S6 will be preferentially passed through the logic circuit 50 to the multiplier 20 (see FIG. 1) in most cases, that is, the amplified signal S9 is mostly larger than the signal S6 in amplitude.

FIG. 10 shows the relationship among the voltages of the input signals S6 and S9 and the output signal S11a in connection with the logic circuit 50. In FIG. 10: the letters "a" and "b" denote positive voltages; the numeral "0" denotes the zero voltage; the characters "−a" and "−b" denote negative voltages; the character "MIN(a, kb)" represents that the lower of the voltages "a" and "kb" is selected and outputted; and the character "MAX(a, kb)" represents that the higher of the voltages "a" and "kb" is selected and outputted. In FIG. 10, nine small blocks represent the respective voltages of the output signal S11a which occur when the input signal S6 assumes the voltage "a", "0", or "−a" and the input signal S9 assumes the voltage "b", "0", or "−b".

the maximum selector 52 or 54 has such a known structure as shown in FIG. 8. The structure of the maximum selector 52 or 54 may be different from that shown in FIG. 8.

The minimum selector 56 or 58 has such a known structure as shown in FIG. 9. The structure of the minimum selector 56 or 58 may be different from that shown in FIG. 9.

DESCRIPTION OF THE THIRD PREFERRED EMBODIMENT

Figures 11, 12:
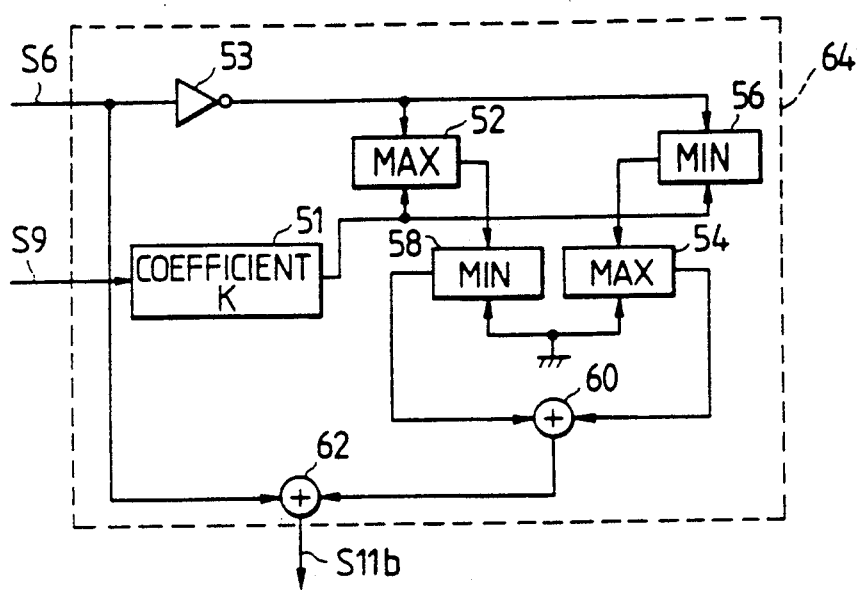
FIG. 11 is a block diagram of a logic circuit in a picture-quality improving circuit according to a third embodiment of this invention.
FIG. 12 is a diagram showing the relationship among the voltages of the input and output signals in connection with the logic circuit of FIG. 11.

FIG. 11 shows a third embodiment of this invention which is similar to the embodiment of FIGS. 7–10 except that the logic circuit 50 (see FIG. 7) is replaced by a logic circuit 64.

As shown in FIG. 11, the logic circuit 64 includes an inverter 53 via which the output signal S6 from the limiter 32 (see FIG. 1) is transmitted to the maximum selector 52 and the minimum selector 56. The logic circuit 64 also includes an adder 62 which combines the signal S6 and the output signal from the adder 60 into a signal S11b applied to the multiplier 20 (see FIG. 1).

FIG. 12 shows the relationship among the voltages of the input signals S6 and S9 and the output signal S11b in connection with the logic circuit 64. In FIG. 12: the letters "a" and "b" denote positive voltages; the numeral "0" denotes the zero voltage; and the characters "−a" and "−b" denote negative voltages. In FIG. 12, nine small blocks represent the respective voltages of the output signal S11b which occur when the input signal S6 assumes the voltage "a", "0", or "−a" and the input signal S9 assumes the voltage "b", "0", or "−b".

DESCRIPTION OF THE FOURTH PREFERRED EMBODIMENT

Figure 13:
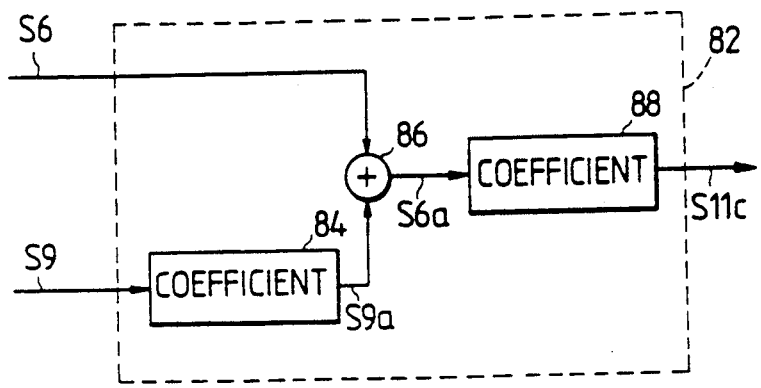
FIG. 13 is a block diagram of a logic circuit in a picture-quality improving circuit according to a fourth embodiment of this invention.

FIG. 13 shows a fourth embodiment of this invention which is similar to the embodiment of FIGS. 1–6 except that the logic circuit 40 (see FIG. 1) is replaced by a logic circuit 82.

As shown in FIG. 13, the logic circuit 82 includes a coefficient device 84 receiving the output signal S9 from the differentiator 38 (see FIG. 1). The logic circuit 82 also includes an adder 86 whose first input terminal receives the output signal S6 from the limiter 32 (see FIG. 1). The coefficient device 84 includes an amplifier whose gain is chosen so that the amplitude of the amplified signal S9a approximately equals the amplitude of the signal S6 in most cases. An output signal S9a from the coefficient device 84 is fed to a second input terminal of the adder 86. The adder 86 combines the signal S6 and the signal S9a into a signal S6a which is applied to a coefficient device 88. The coefficient device 88 includes an amplifier whose gain is predetermined in correspondence with a reference coefficient. The coefficient device 88 derives a signal S11c from the signal S6a. The signal S11c is applied to the multiplier 20 (see FIG. 1).

Figure 14:
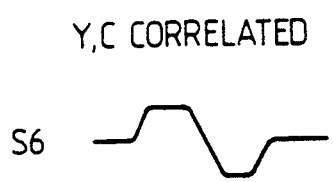
FIG. 14 is a timing diagram showing the waveforms of various signals in the logic circuit of FIG. 13 which occur when the luminance signal and the color signal are mutually correlated.

In cases where the luminance signal S1 and the chrominance signal S2 are correlated in transition, as shown in FIG. 14, the signals S6 and S9a remain in the same polarities so that the output signals S6a and S11c from the adder 86 and the coefficient device 88 exhibit a single sinusoid at the transition. In these cases, the output signal S11c is approximately similar in waveform to the corresponding signal S11 of the embodiment of FIGS. 1–6 so that this embodiment functions similar to the embodiment of FIGS. 1–6.

Figure 15:
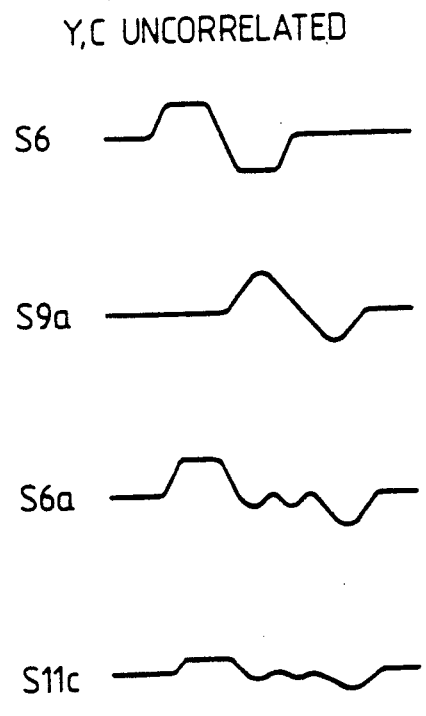
FIG. 15 is a timing diagram showing the waveforms of various signals in the logic circuit of FIG. 13 which occur when the luminance signal and the color signal are uncorrelated.

In cases where the luminance signal S1 and the color signal S2 change at respective points close to each other but the luminance signal S1 and the color signal S2 are uncorrelated in transition, as shown in FIG. 15, during an interval at and near the point of the luminance transition, the signals S6 and S9a assume the opposite polarities respectively so that the signals S6 and S9a are mutually cancelled by the adder 86 and thus the output signal S6a from the adder 86 has small amplitudes. Accordingly, during this interval, the output signal S11c from the coefficient device 88 remains approximately at the zero potential. In these cases, the output signal S11c is thus similar in waveform to the corresponding signal S11 of the embodiment of FIGS. 1–6 so that this embodiment functions similar to the embodiment of FIGS. 1–6.

DESCRIPTION OF THE FIFTH PREFERRED EMBODIMENT

Figure 16:
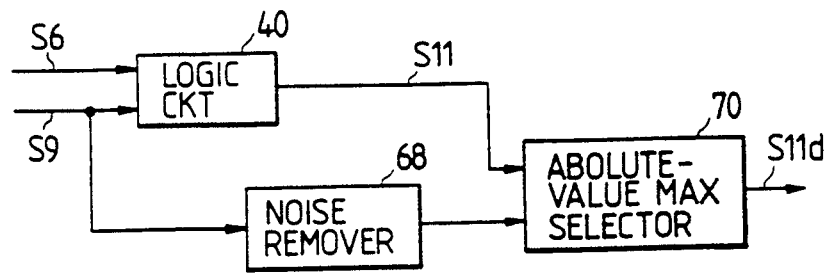
FIG. 16 is a block diagram of part of a picture-quality improving circuit according to a fifth embodiment of this invention.

FIG. 16 shows a fifth embodiment of this invention which is similar to the embodiment of FIGS. 1–6 except for the design changes indicated hereinafter.

The embodiment of FIG. 16 includes an absolute-value maximum selector 70 whose first input terminal receives the output signal S11 from the logic circuit 40. The output signal S9 from the differentiator 38 (see FIG. 1) is passed to a second input terminal of the absolute-value maximum selector 70 by a noise remover 68. The absolute-value maximum selector 70 selects the greater in amplitude of the signal S11 and the output signal from the noise remover 68 and outputs the selected signal S11d to the multiplier 20 (see FIG. 1).

In cases where the luminance signal S1 and the chrominance signal S2 are correlated, the signal S11 is substantially used as the signal S11d so that this embodiment functions similarly to the embodiment of FIGS. 1–6.

Figure 19:
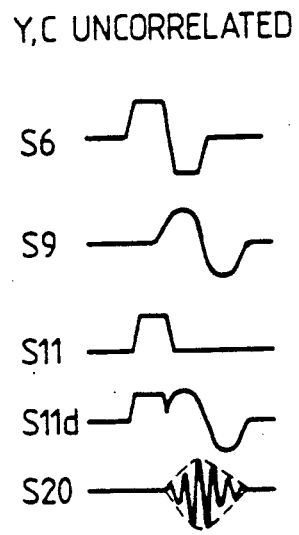
FIG. 19 is a timing diagram showing the waveforms of various signals in the picture-quality improving circuit of FIG. 16 which occur when the luminance signal and the color signal are uncorrelated.

In cases where the luminance signal S1 and the color signal S2 change at respective points close to each other but the luminance signal S1 and the color signal S2 are uncorrelated in transition, as shown in FIG. 19, during an interval at and near the point of the luminance transition, the output signal from the noise remover 68 is selected as the signal S11d. Accordingly, in these cases, the conversion of the original color signal S2 into the output color signal S12 is controlled in response to the output signal from the noise remover 68 which represents the chroma transition. It should be noted that, in FIG. 19, the character S20 denotes the waveform of the output signal from the delay circuit 19 (see FIG. 1) which is applied to the multiplier 20.

Figure 17:
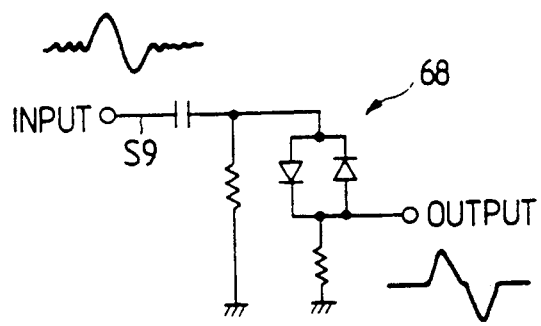
FIG. 17 is a schematic diagram of the noise remover of FIG. 16.

The noise remover 68 has such a known structure as shown in FIG. 17. The structure of the noise remover 68 may be different from that shown in FIG. 9. It should be noted that the noise remover 68 may be omitted from this embodiment.

Figure 18:
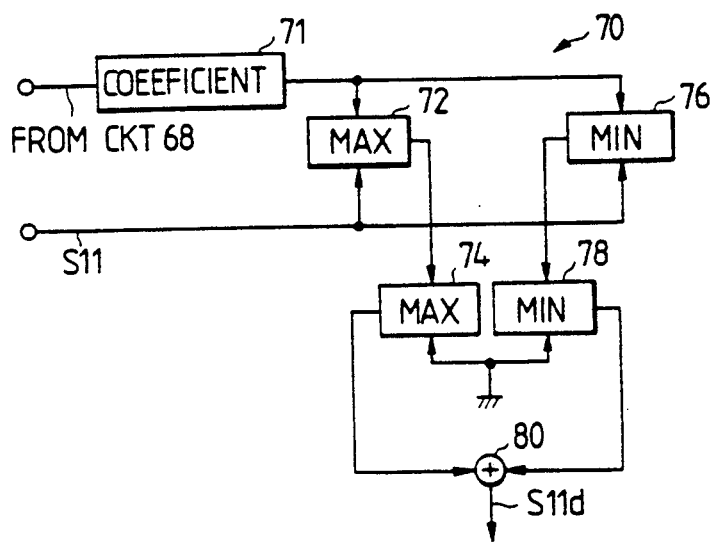
FIG. 18 is a block diagram of the absolute-value maximum selector of FIG. 16.

As shown in FIG. 18, the absolute-value maximum selector 70 includes a coefficient device 71 receiving the output signal from the noise remover 68. An output signal from the coefficient device 71 is fed to a first input terminal of a maximum selector 72 and a first input terminal of a minimum selector 76. A second input terminal of the maximum selector 72 and a second input terminal of the minimum selector 76 are subjected to the output signal S11 from the logic circuit 40. The maximum selector 72 selects the higher in potential of the output signal from the coefficient device 71 and the signal S11 and outputs the selected signal to a first input terminal of a maximum selector 74. The minimum selector 76 selects the lower in potential of the output signal from the coefficient device 71 and the signal S11 and outputs the selected signal to a first input terminal of a minimum selector 78. A second input terminal of the maximum selector 74 and a second input terminal of the minimum selector 78 are subjected to a ground potential. The maximum selector 74 selects the higher in potential of the output signal from the maximum selector 72 and the ground potential and outputs the selected signal to a first input terminal of an adder 80. The minimum selector 78 selects the lower in potential of the output signal from the minimum selector 76 and the ground potential and outputs the selected signal to a second input terminal of the adder 80. The adder 80 combines the output signals from the maximum selector 74 and the minimum selector 78 into the signal S11d which is applied to the multiplier 20 (see FIG. 1).

It should be noted that the logic circuit 40 of the fifth embodiment shown in FIG. 16 may be replaced by the logic circuit 50 of FIG. 7, the logic circuit 64 of FIG. 11, or the logic circuit 82 of FIG. 13.

DESCRIPTION OF THE SIXTH PREFERRED EMBODIMENT

Figure 20:
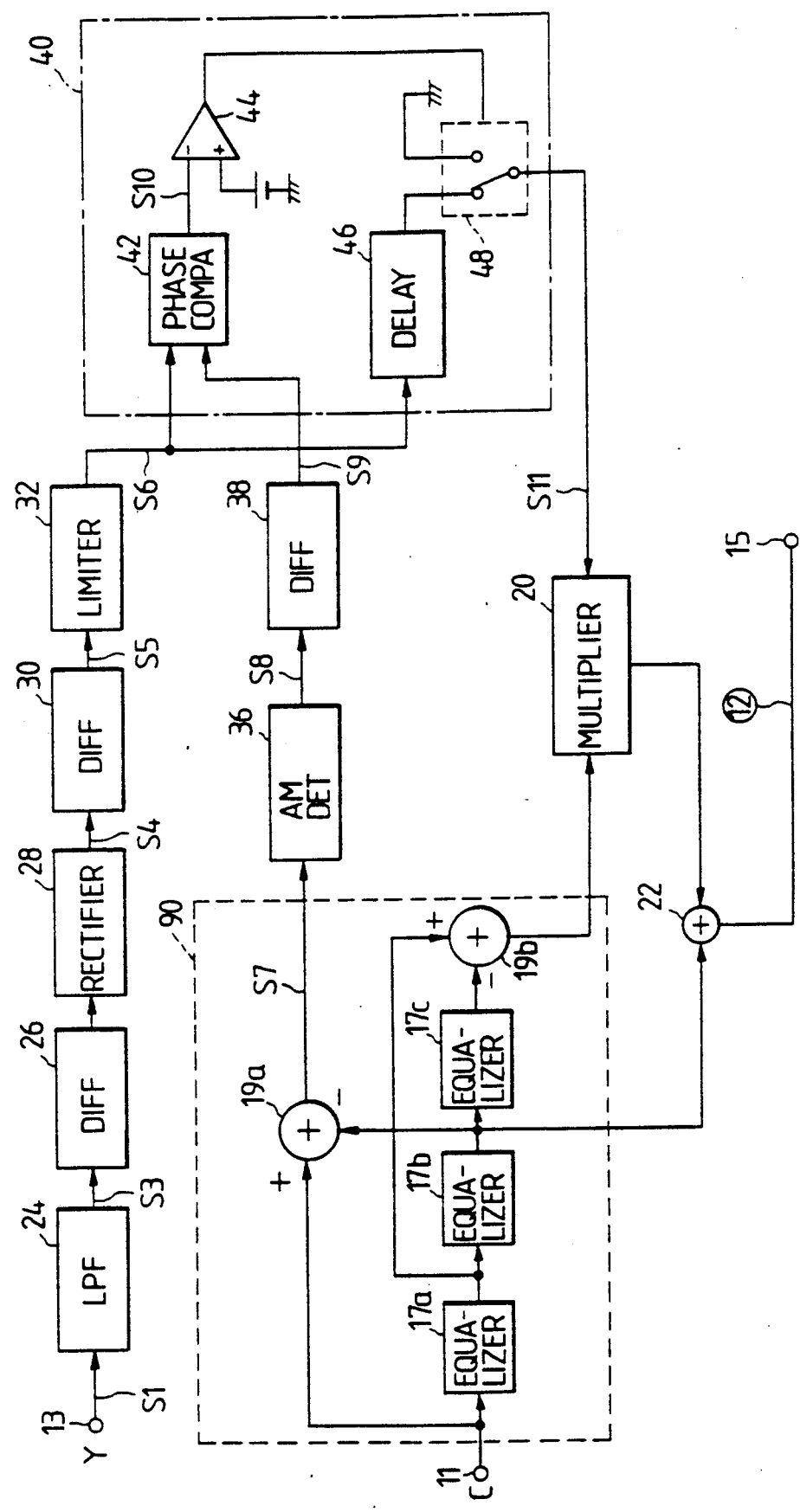
FIG. 20 is a block diagram of a picture-quality improving circuit according to a sixth embodiment of this invention.

FIG. 20 shows a sixth embodiment of this invention which is similar to the embodiment of FIGS. 1–6 except that the combination of the devices 12, 14, 17, and 19 (see FIG. 1) is replaced by a chroma difference extractor 90.

In the embodiment of FIG. 20, the chroma difference extractor 90 receives the color signal S2 via the input terminal 11. The chroma difference extractor 90 differentiates the color signal S2 to yield a signal representing a chroma transition or a chroma edge.

The chroma difference extractor 90 has a cascade combination of equalizers 17a, 17b, and 17c, and subtracters 19a and 19b. The color signal S2 is applied to the first equalizer 17a and a first input terminal of the subtracter 19a. An output signal from the first equalizer 17a is fed to a first input terminal of the subtracter 19b and the second equalizer 17b. An output signal from the second equalizer 17b is fed to a second input terminal of the subtracter 19a and the third equalizer 17c. The output signal from the second equalizer 17b is also applied to the adder 22. An output signal from the third equalizer 17c is fed to a second input terminal of the subtracter 19b. The subtracter 19a subtracts the output signal of the second equalizer 17b from the color signal S2 and thereby differentiates the color signal S2 to yield a signal S7 representative of a chroma transition. The chroma transition signal S7 is fed to the AM detector 36. The subtracter 19b subtracts the output signal of the third equalizer 17c from the output signal of the first equalizer 17a to yield a signal which is fed to the multiplier 20.

Figure 21:
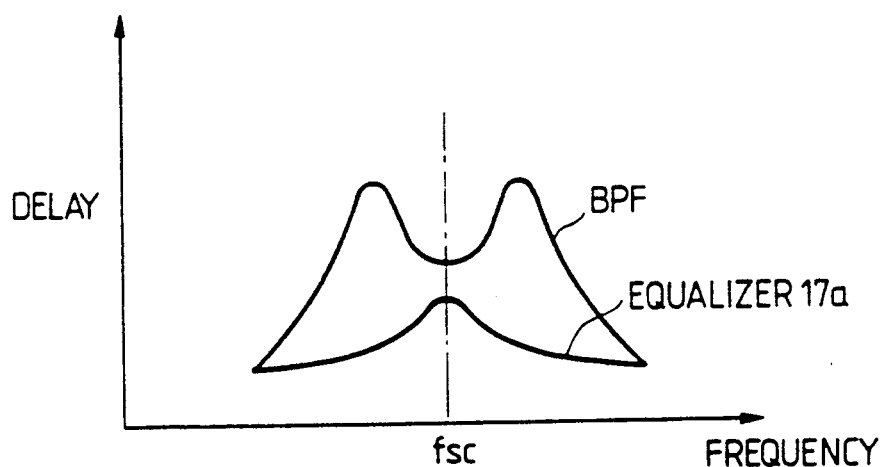
FIG. 21 is a diagram showing the frequency-dependent delay characteristics of a band-pass filter and the first equalizer of FIG. 20.
Figure 22:
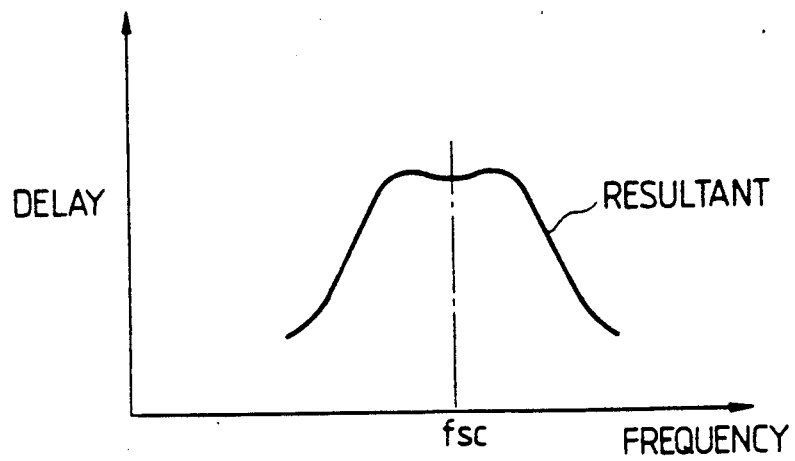
FIG. 22 is a diagram showing the resultant frequency-dependent delay characteristics of the band-pass filter and the first equalizer of FIG. 20.

The first equalizer 17a delays the color signal by a predetermined time, for example, 500 ns, to cancel the signal side-band lag caused by a band-pass filter (BPF) and other devices provided within a stage in front of the chroma difference extractor 90. As shown in FIG. 21, such a BPF causes great delays to side bands of the color subcarrier and small delays to the color subcarrier having a frequency "fsc". The frequency-dependent delay characteristics of the first equalizer 17a is designed to compensate those of the BPF. As shown in FIG. 22, the resultant frequency-dependent delay characteristics of the combination of the BPF and the first equalizer 17a are approximately flat over a wide range extending at and around the color subcarrier frequency "fsc".

Figure 23:
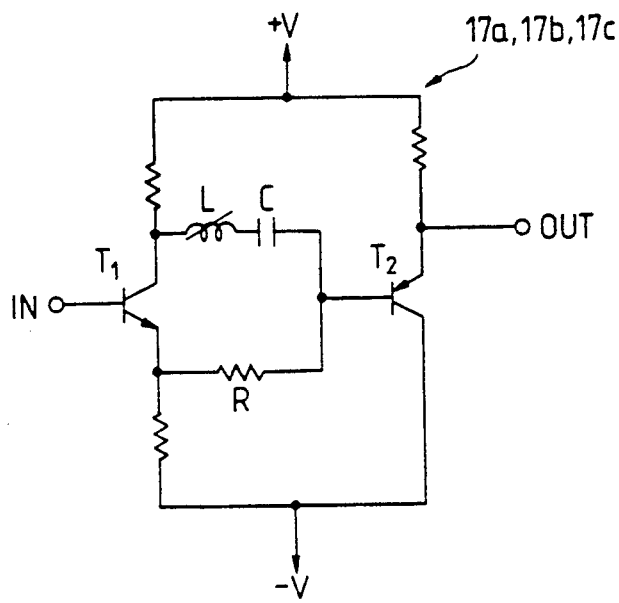
FIG. 23 is a schematic diagram of each of the equalizers of FIG. 20.
Figure 24:
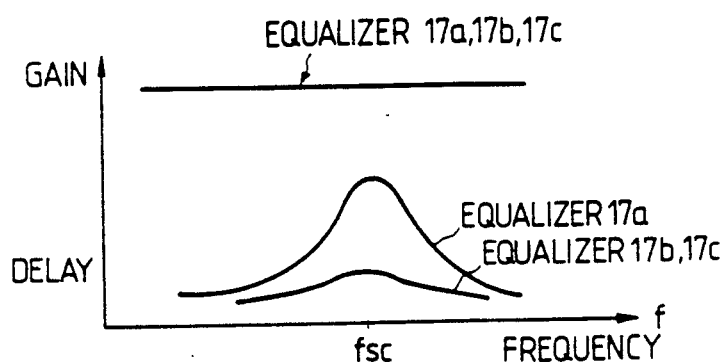
FIG. 24 is a diagram showing the frequency-dependent gain characteristics and the frequency-dependent delay characteristics of each of the equalizers of FIG. 20.
Figure 25:
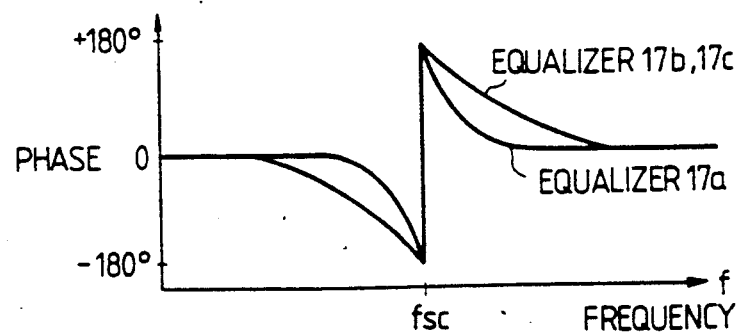
FIG. 25 is a diagram showing the frequency-dependent phase characteristics of each of the equalizers of FIG. 20.

Each of the equalizers 17a–17c has such a known structure as shown in FIG. 23. Specifically, each of the equalizers 17a–17c includes a combination of transistors T1 and T2, an inductor L, a capacitor C, and a resistor R. The inductor L and the capacitor C constitute a resonance network. This resonance network is tuned to the color subcarrier frequency "fsc" by suitably adjusting the inductor L and the capacitor C. As shown in FIG. 24, the gain of each of the equalizers 17a–17c is flat independent of the frequency. As shown in FIG. 24, the signal delay offered by each of the equalizers 17a–17c peaks at the color subcarrier frequency "fsc". As shown in FIG. 25, the signal undergoes a phase shift of 180° at the color subcarrier frequency "fsc" through each of the equalizers 17a–17c.

As shown in FIG. 24, the signal delays offered by the second and third equalizers 17b and 17c are set smaller than the signal delay offered by the first equalizer 17a. This design is based on the following reason. The second and third equalizers 17b and 17c and the subtracter 19b constitute a device generating a signal which is used by the multiplier 20 to enhance the color signal. On the other hand, the first and second equalizers 17a and 17b and the subtracter 19a constitute a chroma edge detector. In order to attain a high sensitivity of this chroma edge detector, the delay quantity of the first equalizer 17 is set great and the signal difference is determined at points adequately distant from each other.

It should be noted that the embodiment of FIGS. 20–25 may be varied in various ways. For example, the logic circuit 40 may be replaced by the logic circuit 50 of FIG. 7, the logic circuit 64 of FIG. 11, or the logic circuit 82 of FIG. 13. Also, the noise remover 68 and the absolute-value maximum selector 70 may be added as in the embodiment of FIG. 16.

What is claimed is:

1. A picture-quality improving circuit comprising:
    means for generating a chroma edge signal on the basis of a color signal, the chroma edge signal representing a chroma edge;
    means for generating a luminance edge signal on the basis of a luminance signal, the luminance edge signal representing a luminance edge;
    means for detecting a chroma edge signal;
    means for differentiating an output signal from the detecting means;
    means for determining whether or not the luminance edge signal and an output signal from the differentiating means are in a same polarity;
    means for selecting the luminance edge signal when the luminance edge signal and the output signal from the differentiating means are in the same polarity and, for selecting a reference signal when the luminance edge signal and the output signal from the differentiating means are not in the same polarity;
    means for multiplying a signal and an output signal from the selecting means; and
    means for adding an output signal from the multiplying means to the color signal to yield an enhanced color signal.

2. The picture-quality improving circuit of claim 1 wherein the chroma-edge-signal generating means comprises first and second subtracters, and a cascade combination of first, second, and third equalizers; the color signal is fed to an input terminal of the first equalizer and a first input terminal of the first subtracter; an output signal from the first equalizer is fed to an input terminal of the second equalizer and a first input terminal of the second subtracter; an output signal from the second equalizer is fed to a second input terminal of the first subtracter, an input terminal of the third equalizer, and the adding means; an output signal from the third equalizer is fed to a second input terminal of the second subtracter; an output signal from the first subtracter is fed to the detecting means; and an output signal from the second subtracter is fed to the multiplying means.

* * * * *